US008521828B2

(12) United States Patent
Malamud et al.

(10) Patent No.: US 8,521,828 B2
(45) Date of Patent: Aug. 27, 2013

(54) THEMES INDICATIVE OF PARTICIPANTS IN PERSISTENT COMMUNICATION

(75) Inventors: Mark A. Malamud, Seattle, WA (US); John D. Rinaldo, Jr., Bellevue, WA (US); Royce A. Levien, Lexington, MA (US); Paul G. Allen, Seattle, WA (US); Edward K. Y. Jung, Bellevue, WA (US)

(73) Assignee: The Invention Science Fund I, LLC, Bellevue, WA (US)

( * ) Notice: Subject to any disclaimer, the term of this patent is extended or adjusted under 35 U.S.C. 154(b) by 1336 days.

(21) Appl. No.: 10/909,253

(22) Filed: Jul. 30, 2004

(65) Prior Publication Data

US 2006/0026255 A1 Feb. 2, 2006

(51) Int. Cl.
*G06F 15/16* (2006.01)

(52) U.S. Cl.
USPC ........... 709/207; 709/204; 709/205; 709/206; 455/412.2; 715/752; 379/88.12

(58) Field of Classification Search
USPC ..................... 709/203, 204–207; 379/88.12; 715/752–753; 455/412.2, 466; 370/260
See application file for complete search history.

(56) References Cited

U.S. PATENT DOCUMENTS

| 4,952,931 | A | 8/1990 | Serageldin et al. | |
|---|---|---|---|---|
| 5,386,210 | A | 1/1995 | Lee | |
| 5,436,653 | A | 7/1995 | Ellis et al. | 725/22 |
| 5,548,188 | A | 8/1996 | Lee | |
| 5,675,708 | A | 10/1997 | Fitzpatrick et al. | |
| 6,212,233 | B1 | 4/2001 | Alexandre et al. | 375/240.03 |
| 6,262,734 | B1 * | 7/2001 | Ishikawa | 715/850 |
| 6,269,483 | B1 | 7/2001 | Broussard | 725/143 |
| 6,317,776 | B1 * | 11/2001 | Broussard et al. | 709/204 |
| 6,396,399 | B1 | 5/2002 | Dunlap | |
| 6,438,223 | B1 | 8/2002 | Eskafi et al. | |
| 6,617,980 | B2 | 9/2003 | Endo et al. | |
| 6,622,115 | B1 | 9/2003 | Brown et al. | |
| 6,690,883 | B2 | 2/2004 | Pelletier | |
| 6,720,949 | B1 | 4/2004 | Pryor et al. | |
| 6,775,835 | B1 | 8/2004 | Ahmad et al. | |
| 6,819,919 | B1 | 11/2004 | Tanaka | 455/414.1 |
| 7,043,530 | B2 * | 5/2006 | Isaacs et al. | 709/206 |
| 7,120,865 | B1 * | 10/2006 | Horvitz et al. | 715/514 |
| 7,779,076 | B2 * | 8/2010 | Heikes et al. | 709/206 |
| 2002/0025026 | A1 | 2/2002 | Gerszberg et al. | 379/67.1 |
| 2002/0028674 | A1 | 3/2002 | Slettengren et al. | |
| 2002/0155844 | A1 | 10/2002 | Rankin et al. | |
| 2002/0176585 | A1 | 11/2002 | Egelmeers et al. | 381/71.11 |
| 2002/0184505 | A1 | 12/2002 | Mihcak et al. | |
| 2003/0048880 | A1 | 3/2003 | Horvath et al. | 379/88.01 |

(Continued)

FOREIGN PATENT DOCUMENTS

WO     WO 03/058485 A1    7/2003
WO   PCT/US2005/026429    2/2006

OTHER PUBLICATIONS

PCT International Search Report; International App. No. PCT/US05/29768; Apr. 18, 2006.

(Continued)

*Primary Examiner* — Alina N. Boutah
(74) *Attorney, Agent, or Firm* — Suiter Swantz pc llo

(57) ABSTRACT

An auditory theme represents at least one participant in a networked group interaction, and reflects an attribute of that participant.

24 Claims, 5 Drawing Sheets

(56) References Cited

U.S. PATENT DOCUMENTS

| | | | |
|---|---|---|---|
| 2003/0117987 A1 | 6/2003 | Brebner | |
| 2003/0145054 A1* | 7/2003 | Dyke | 709/205 |
| 2003/0202780 A1 | 10/2003 | Dumm et al. | |
| 2003/0218631 A1* | 11/2003 | Malik | 345/739 |
| 2003/0225848 A1* | 12/2003 | Heikes et al. | 709/207 |
| 2004/0012613 A1 | 1/2004 | Rast | 345/632 |
| 2004/0024822 A1* | 2/2004 | Werndorfer et al. | 709/206 |
| 2004/0044777 A1 | 3/2004 | Alkhatib et al. | |
| 2004/0109023 A1* | 6/2004 | Tsuchiya | 345/758 |
| 2004/0127198 A1* | 7/2004 | Roskind et al. | 455/412.2 |
| 2004/0127241 A1 | 7/2004 | Shostak | |
| 2004/0128353 A1* | 7/2004 | Goodman et al. | 709/204 |
| 2004/0143636 A1* | 7/2004 | Horvitz et al. | 709/207 |
| 2004/0148346 A1* | 7/2004 | Weaver et al. | 709/204 |
| 2004/0196963 A1* | 10/2004 | Appelman et al. | 379/88.12 |
| 2004/0205775 A1* | 10/2004 | Heikes et al. | 719/318 |
| 2004/0215731 A1* | 10/2004 | Tzann-en Szeto | 709/207 |
| 2004/0215732 A1* | 10/2004 | McKee et al. | 709/207 |
| 2004/0236836 A1* | 11/2004 | Appelman et al. | 709/206 |
| 2004/0243682 A1* | 12/2004 | Markki et al. | 709/207 |
| 2005/0018925 A1 | 1/2005 | Bhagavatula et al. | 382/278 |
| 2005/0053356 A1 | 3/2005 | Mate et al. | |
| 2005/0125500 A1* | 6/2005 | Wu | 709/207 |
| 2006/0004911 A1* | 1/2006 | Becker et al. | 709/207 |
| 2006/0187305 A1 | 8/2006 | Trivedi et al. | |
| 2007/0203911 A1 | 8/2007 | Chiu | |
| 2007/0288978 A1 | 12/2007 | Pizzurro et al. | |
| 2008/0037840 A1 | 2/2008 | Steinberg et al. | |
| 2008/0059530 A1 | 3/2008 | Cohen et al. | |

OTHER PUBLICATIONS

PCT International Search Report; International App. No. PCT/US05/26428; Feb. 2, 2006.

Rugaard, Peer; Sapaty, Peter; "Mobile Control of Mobile Communications"; pp. 1-2; located at: http://www-zorn.ira.uka.de/wave/abstract2.html; printed on Mar. 4, 2005.

PCT International Search Report; International App. No. PCT/US05/26429; Feb. 1, 2007.

* cited by examiner

THEMES INDICATIVE OF PARTICIPANTS IN PERSISTENT COMMUNICATION

TECHNICAL FIELD

The present disclosure relates to group communication environments.

BACKGROUND

People increasingly interact by way of networked group communication mechanisms. Mechanisms of this type include chat rooms, virtual environments, conference calls, and online collaboration tools.

Group networked environments offer many advantages, including the ability to bring together many individuals in a collaborative fashion without the need for mass group travel to a common meeting place. However, group networked environments often fall short in one important aspect of human communication: richness. It may be challenging to convey certain aspects of group interaction that go beyond speech. For example, the air of authority that a supervisor or other organization superior conveys in a face-to-face environment may be lacking in a networked environment. As another example, a networked group interaction may fail to convey the many subtle and not-so-subtle expressions of mood that may accompany proximity, dress, body language, and inattentiveness in a group interaction.

SUMMARY

The following summary is intended to highlight and introduce some aspects of the disclosed embodiments, but not to limit the scope of the invention. Thereafter, a detailed description of illustrated embodiments is presented, which will permit one skilled in the relevant art to make and use aspects of the invention. One skilled in the relevant art can obtain a full appreciation of aspects of the invention from the subsequent detailed description, read together with the figures, and from the claims (which follow the detailed description).

An auditory theme is presented representing at least one participant in a networked group interaction, and reflecting an attribute of that participant. The theme may reflect an interaction status of the participant. The theme may represent the participant's status in the interaction, status in an organization, an interaction context of the at least one participant, or at least one attribute of the at least one participant.

BRIEF DESCRIPTION OF THE DRAWINGS

The headings provided herein are for convenience only and do not necessarily affect the scope or meaning of the claimed invention.

In the drawings, the same reference numbers and acronyms identify elements or acts with the same or similar functionality for ease of understanding and convenience. To easily identify the discussion of any particular element or act, the most significant digit or digits in a reference number refer to the figure number in which that element is first introduced.

DETAILED DESCRIPTION

The invention will now be described with respect to various embodiments. The following description provides specific details for a thorough understanding of, and enabling description for, these embodiments of the invention. However, one skilled in the art will understand that the invention may be practiced without these details.

In other instances, well known structures and functions have not been shown or described in detail to avoid unnecessarily obscuring the description of the embodiments of the invention. References to "one embodiment" or "an embodiment" do not necessarily refer to the same embodiment, although they may.

Figure 1:
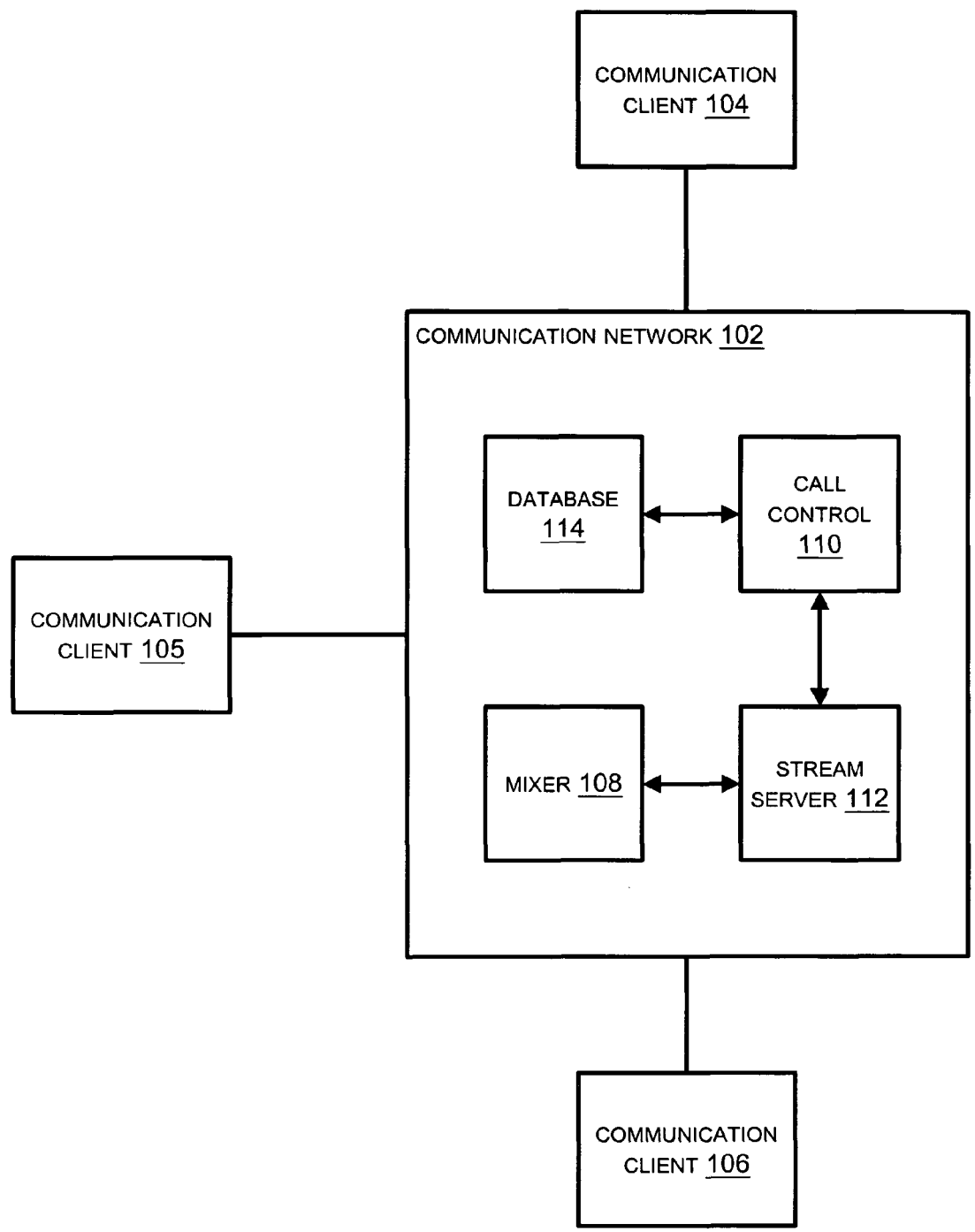
FIG. 1 is a block diagram of an embodiment of a networked group communication environment.

FIG. 1 is a block diagram of an embodiment of a networked group communication environment. The communication network 102 comprises mixer logic 108, call control logic 110, streaming logic 112, and a database 114. "Logic" refers to signals and/or information that may be applied to affect the operation of a device. Software and firmware are examples of logic. Logic may also be embodied in circuits, and/or combinations of software and circuits.

Clients 104, 105, 106 are devices that communicate with and by way of the communication network 102. Some examples of communications clients are personal computers (PCs), personal digital assistants (PDAs), laptop computers, and wireless telephones. A communication network comprises one more devices cooperating to enable communication between clients of the network, and may additionally provide services such as chat, email, and directory assistance. Examples of networks include the Internet, intranets, and public and private telephone networks.

The mixer 108 combines signals representing sounds. The call control 110 provides for establishment, termination, and control of connections between the clients 102,104,106 and the network 102.

The stream server 112 provides to the clients 102,104,106 information streams representing auditory signals (e.g. sounds). The database 114 comprises collection(s) of information and/or associations among information. Each of these elements is presented in this embodiment as included within the network 102. However, alternative embodiments may locate various of these elements in the communications clients. Also, some of the functions provided by these elements may reside within the network, but particular communication clients may comprise similar capabilities and may use local capabilities instead of the network functionality.

The clients 102,104,106 may be employed in a networked group interaction, such as a conference call, chat room, virtual environment, online game, or online collaboration environment. Auditory themes may be presented representing the participants of the interaction. The auditory theme may include one or more tones, one or more songs, one or more tunes, one or more spoken words, one or more sound clips, or one or more jingles, to name just some of the possibilities.

Various effects may be applied to the theme to reflect the participant's interaction status or other attributes. For example, the gain, tempo, tone, key, orchestration, orientation or distribution of sound, echo, or reverb of the theme (to name just some of the possible effects) may be adjusted to represent an interaction status or attribute of the participant. Examples of participant attributes are the participant's role or status in an organization, group, association of individuals, legal entity, cause, or belief system. For example, the director of an organization might have an associated auditory theme that is more pompous, weighty, and serious than the theme for other participants with lesser roles in the same organization. To provide a sense of gravitas, the theme might be presented at lower pitch and with more echo.

Examples of a participant's group interaction status include joined status (e.g. the participant has recently joined the group communication), foreground mode status (e.g. the participant "has the floor" or is otherwise actively communicating), background mode status (e.g. the participant has not interacted actively in the communication for a period of time, or is on hold), dropped status (e.g. the participant has ceased participating in the group interaction), or unable to accept communications status (e.g. the participant is busy or otherwise unable to respond to communication).

Another aspect which may determine at least in part the participant's auditory theme is the participant's interaction context. The interaction context includes a level of the participant's interaction aggression (e.g. how often and/or how forcefully the participant interacts), virtual interaction proximity of the participant to the other participants, or a role of the participant in the interaction. By virtual interaction proximity is meant some form of location, which may be an absolute or relative physical location such as geographic location or location within a building or room or with respect to the other participants. As an example of the latter, if all of the participants are at one location in Phoenix except for one who is in Washington D.C., the distance between that individual and the rest of the group participants may be reflected in some characteristic of his auditory theme. Alternatively or additionally, it may be a virtual location such as a simulated location in the interaction environment. For example, when a group is playing a game over a network, one of the participants may be (virtually) in a cave, while the others are (virtually) in a forest. The virtual locations of the individual participants may be reflected in some characteristics of their auditory themes.

Another aspect which may determine at least in part the participant's auditory theme is at least one attribute of the participant. Attributes comprise a participant's age (e.g. a child might have a lighter, more energetic theme), gender, location, recognition as an expert, education level (such as PhD, doctor), membership in a group or organization, or physical attributes such as a degree of deafness (e.g. the auditory theme might be made louder, simpler, or suppressed).

The auditory theme may be presented in an ongoing fashion during the participant's participation in the interaction. Alternatively or additionally, the auditory signal may be presented in a transitory fashion in response to an interaction event. Examples of an interaction event include non-auditory events, such as interaction with a control or object of the interaction environment. An on-going auditory theme may have transitory themes interspersed within its presentation.

Figure 2:
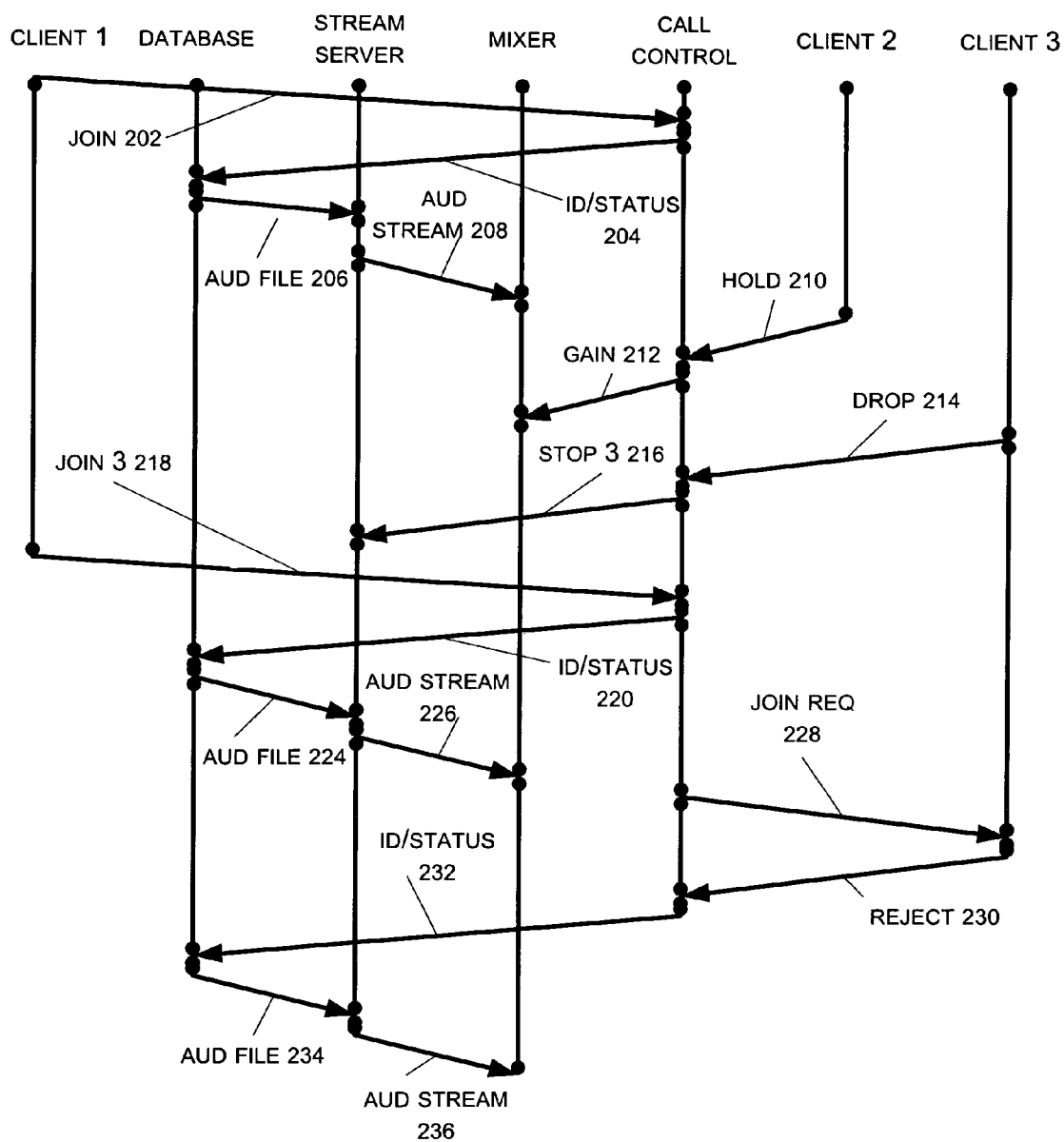
FIG. 2 is an action diagram of an embodiment of a method of providing an audible theme for a participant in networked group communication.

FIG. 2 is an action diagram of an embodiment of a method of providing an audible theme for a participant in networked group communication. Participants join, drop off, rejoin, and reject participation in the group communication, among other things. During these interactions, an auditory signal (i.e. theme) is set for a networked group interaction which may comprise an indication of an available status of at least one participant of the group. For example, when one potential participant in the group communication rejects participation, at least one theme associated with that participant may reflect a busy signal.

At 202 communication client 1, associated with a first participant, provides a request to join the networked group interaction. At 204 and 206 the call control looks up and retrieves from the database an audio theme representing that the first participant in particular has joined the interaction. At 208 this theme is mixed with other themes for other participants.

At 210 a second communication client 2, associated with a second participant, provides an indication that the second participant has gone "on hold". At 212 the call control sets a gain for the second participant's theme, corresponding to the second participant being "on hold". Thus, the audible signal presented to the other communication participants in association with the second participant indicates that the second participant is now on hold. An example of such indication might be presentation of an attenuated theme for the second participant.

At 214 a third communication client 3, associated with a third participant, drops out of the group interaction. At 216 the call control ceases presentation of the audible theme associated with the third participant.

At 218 the first participant attempts to rejoin the third participant with the group interaction. At 220 and 224 the call control looks up and retrieves an audio theme representing that the third participant is being rejoined to the group interaction. At 226 the stream server mixes this audio theme with the themes for the other participants. However, when at 228 the call control attempts to rejoin the third participant with the interaction, the third participant rejects the attempt at 230. At 232 and 234 the call control looks up and retrieves an audio theme indicating that the third participant has rejected the attempt to join him (or her) with the interaction. This audio theme may in some embodiments reflect a busy signal. At 236 the theme for the third participant is mixed with the themes for the other participants.

Figure 3:
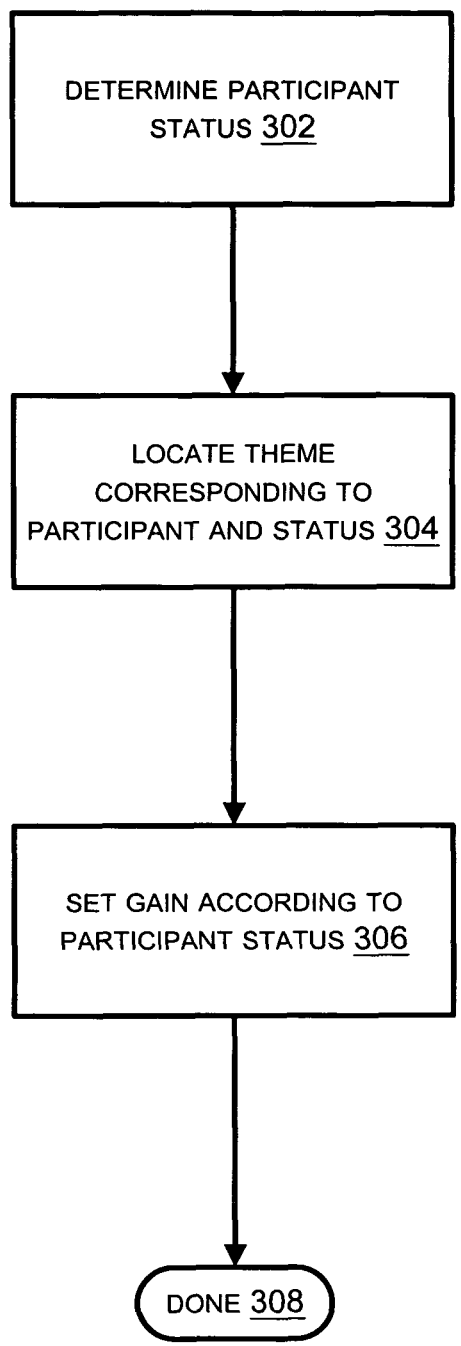
FIG. 3 is a flow chart of an embodiment of a method of determining a theme for a participant in networked group communication.

FIG. 3 is a flow chart of an embodiment of a method of determining a theme for a participant in a networked group interaction. At 302 a participant status is determined. At 304 a theme corresponding to the participant and status is determined. At 306 the signal gain (e.g. volume) for the theme is set at least in part according to the participant status. The resulting auditory signal includes at least one theme indicative of an attention status of at least one participant of the networked group interaction. The attention status is indicative of the level of participation in the group communication. Indications of attention level include number, length, loudness, and frequency of responses to communication by others; whether or not the participant is on hold; whether or not the participant has dropped; and whether or not the participant responds to questions. At 308 the process concludes.

Of course, this is merely one example of either selecting or adjusting a theme according to a participant and some aspect or attribute of that participant.

Figure 4:
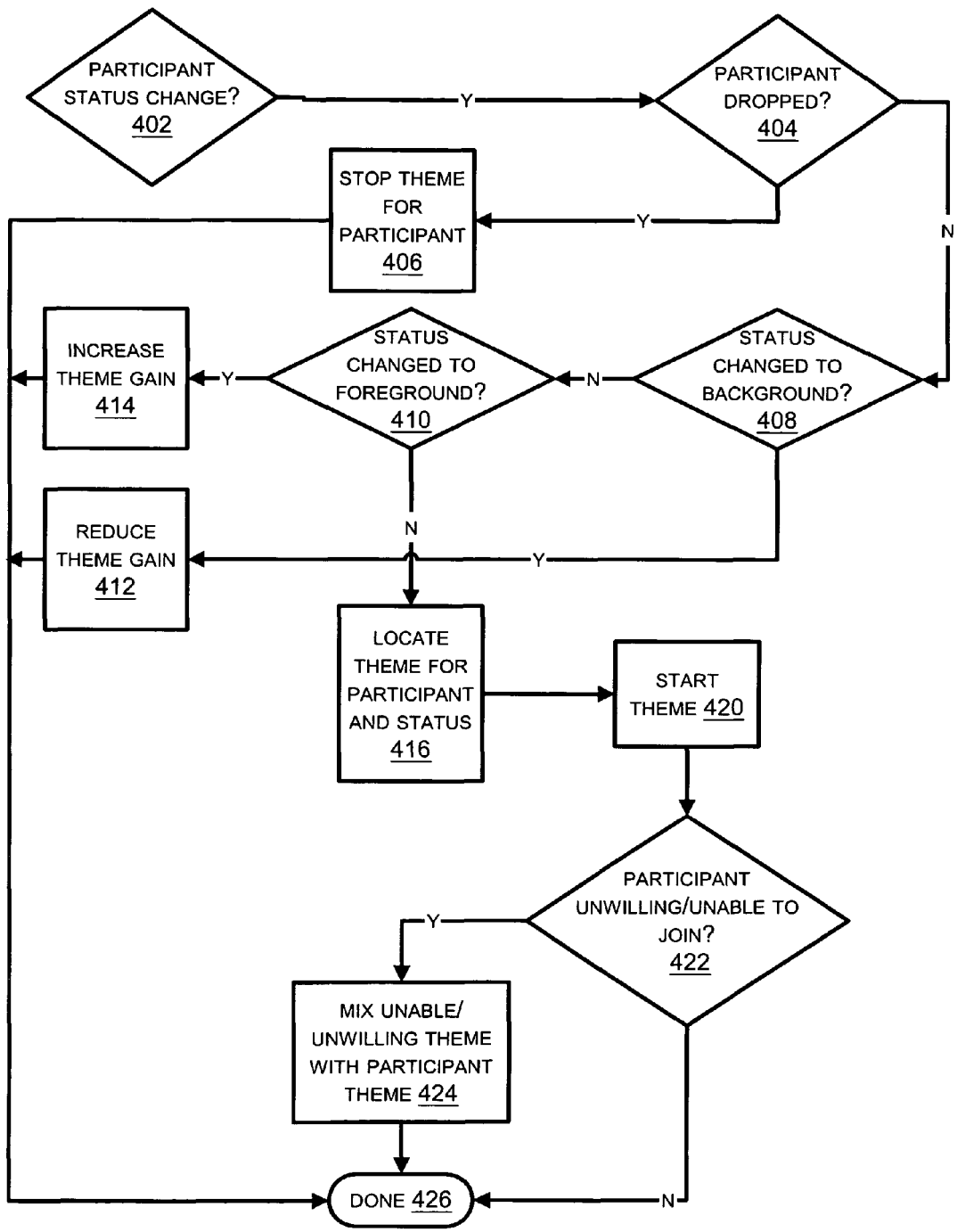
FIG. 4 is also a flow chart of an embodiment of a method of determining a theme for a participant in networked group communication.

FIG. 4 is also a flow chart of an embodiment of a method of determining a theme for a participant in networked group communication. The theme volume characteristics are modified to reflect the availability status of the participant.

If at 402 the participant status has changed, a check is made at 404 to determine if the participant has dropped out of the group interaction. If the participant has dropped, the theme for the participant is stopped at 406. If the participant has not dropped, a check is made at 408 to determine if the participant's status has changed to a "background" mode, which is a less interactive status such as "on hold". If the participant status has changed to background, the theme gain for the participant is reduced at 412.

If the participant has not changed to a background status, a check at 410 determines if the participant now has a foreground status, which is an active participation status, for example, perhaps the participant "has the floor" and is speaking or otherwise providing active communication in the interaction. If so, the gain for the participant's theme is increased at 414. In some situations, it may be suitable to stop, suppress, or otherwise attenuate the theme of the active speaker, and/or the non-active speakers, so as not to interfere with spoken communications among the participants. A result is an ongoing, device-mediated interaction among multiple participants, wherein a richer amount of information relating to attributes of the participants is conveyed via ongoing and transient themes particular to a participant (or group of participants) and attributes thereof.

At 416 a theme is located corresponding to the participant and status. The theme is started at 420. If at 422 the participant is unwilling/unable to join, an unable/unwilling theme (such as a busy signal) is mixed at 424 with the participant's selected theme as modified to reflect his status. At 426 the process concludes.

Figure 5:
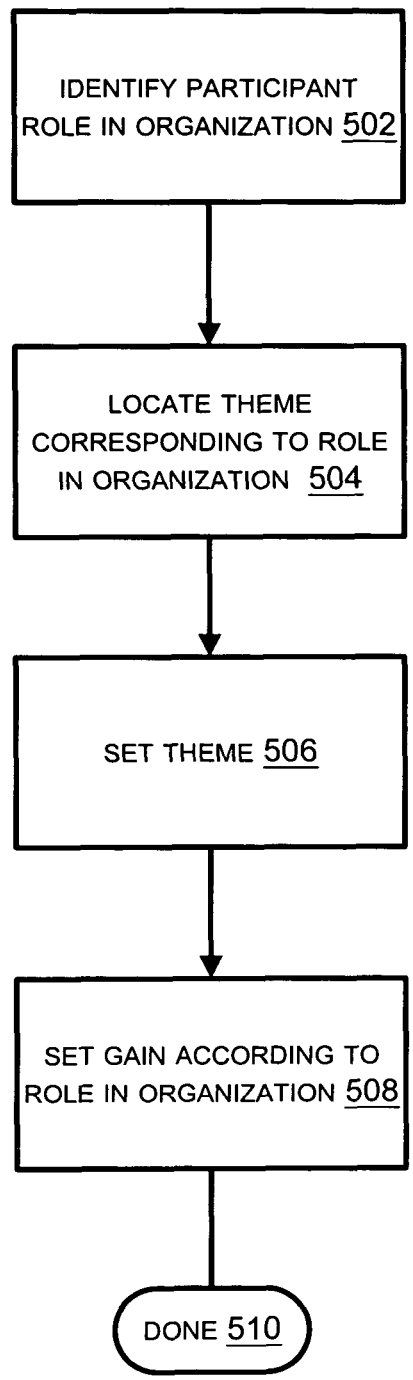
FIG. 5 is a flow chart of an embodiment of a method of determining a theme for a participant in networked group communication according to a role of the participant in an organization.

FIG. 5 is a flow chart of an embodiment of a method of determining a theme for a participant in networked group communication according to a role of the participant in an organization. The role of a participant in the group interaction may reflect their role in an organization, or may be unrelated. For example, a secretary in a business may assume the role of group moderator in a networked group interaction. At least one theme determined in this manner may be reflected in the final auditory signals presented to at least one group communication participant. At 502 a participant's role, position, or status in an organization is identified. One method of identifying the participants role, position, or status is from information of an organization chart. At 504 a theme is located corresponding at least in part to the participant's role, status, or position in the organization. At 506 the theme is set. At 508 a gain for the theme (e.g. determining the volume) is set at least in part according to the participant's role, position, or status in the organization. For example, if one of the group participants is head of a product group, and another is her secretary acting in the role of transcriber, the gain for the product group head may be set such that her theme is has higher volume than her secretary's theme. At 510 the process concludes.

Again, this is merely one example of setting a theme and/or theme effect according to an attribute of the participant.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively. Additionally, the words "herein," "above," "below" and words of similar import, when used in this application, shall refer to this application as a whole and not to any particular portions of this application. When the claims use the word "or" in reference to a list of two or more items, that word covers all of the following interpretations of the word: any of the items in the list, all of the items in the list and any combination of the items in the list.

What is claimed is:

1. A method comprising:
   associating an auditory theme with at least one participant in a networked group interaction; and
   modifying at least one of a tempo, tone, key, orchestration, orientation or distribution of sound, echo, or reverb effect of the auditory theme according to at least one characteristic of the at least one participant in the networked group interaction.

2. The method of claim 1 wherein the modifying at least one of a tempo, tone, key, orchestration, orientation or distribution of sound, echo, or reverb effect of the auditory theme representing the at least one participant according to at least one characteristic of the at least one participant includes:
   modifying the auditory theme representing the at least one participant according to at least one of an interaction status, an attention status, or an available status of the at least one participant.

3. The method of claim 2 wherein the attention status is indicative of a level of participation of the at least one participant in the interaction.

4. The method of claim 2 further comprising:
   modifying a volume of the auditory theme according to the attention status of the at least one participant.

5. The method of claim 1 wherein the modifying at least one of a tempo, tone, key, orchestration, orientation or distribution of sound, echo, or reverb effect of the auditory theme representing the at least one participant according to at least one characteristic of the at least one participant includes:
   modifying the auditory theme representing the at least one participant according to at least one of the participant's status in the interaction, or a status in an organization, an interaction context of the at least one participant.

6. The method of claim 5 wherein the at least one participant status in an organization is determined from an organization chart.

7. The method of claim 5 further comprising:
   modifying a gain of the auditory theme according to the at least one participant status in an organization.

8. The method of claim 7 wherein setting a gain of the auditory theme further comprises:
   setting the gain according to at least one participant position in an organization chart.

9. The method of claim 1 wherein the modifying at least one of a tempo, tone, key, orchestration, orientation or distribution of sound, echo, or reverb effect of the auditory theme representing the at least one participant according to at least one characteristic of the at least one participant includes:
   modifying the auditory theme representing the at least one participant according to at least one of a participant age, affiliation, gender, or location.

10. The method of claim 1 wherein the modifying at least one of a tempo, tone, key, orchestration, orientation or distribution of sound, echo, or reverb effect of the auditory theme representing the at least one participant according to at least one characteristic of the at least one participant includes:
    modifying the auditory theme representing the at least one participant according to at least one participant membership in a group or an organization.

11. The method of claim 1 wherein the modifying at least one of a tempo, tone, key, orchestration, orientation or distribution of sound, echo, or reverb effect of the auditory theme representing the at least one participant according to at least one characteristic of the at least one participant includes:
    modifying the auditory theme representing the at least one participant according to at least one of a level of the participant's interaction aggression, virtual interaction proximity of the participant to other participants of the interaction, or a role of the participant in the interaction.

12. The method of claim 1, wherein the auditory theme includes at least one of: one or more tones, one or more songs, one or more tunes, one or more spoken words, one or more sound clips, or one or more jingles.

13. The method of claim 1 wherein the auditory theme is presented in an ongoing fashion during the participant's participation in the interaction.

14. The method of claim 1 wherein the auditory theme is presented in a transitory fashion in response to an interaction event.

15. The method of claim 1 further comprising:
terminating presenting the theme when at least one participant interaction status changes to dropped status.

16. The method of claim 1 further comprising:
applying a second modification to the auditory theme.

17. The method of claim 16 wherein the applying a second modification to the auditory theme includes:
setting a volume of the at least one auditory theme indicative of the status of the at least one participant in the organization.

18. The method of claim 1 wherein modifying at least one of a tempo, tone, key, orchestration, orientation or distribution of sound, echo, or reverb effect of the auditory theme according to at least one characteristic of the at least one participant of the group, includes:
setting a volume of the at least one theme according to the available status of the at least one participant.

19. The method of claim 1 wherein the at least one theme includes:
a busy signal.

20. The method of claim 1 wherein the networked group interaction is selected from at least one of: a conference call, chat room, virtual environment, online game, or online collaboration environment.

21. A method comprising:
determining at least one auditory theme representing at least one participant in a networked group interaction;
modifying one or more audio signal characteristics of the auditory theme representing the at least one participant according to at least one of a joined status, a foreground mode status, a background mode status, a dropped status, or an unable to accept communications status of the at least one participant; and
presenting the auditory theme representing the at least one participant.

22. The method of claim 21 wherein modifying audio signal characteristics of the auditory theme representing the at least one participant according to at least one of a foreground mode status or a background mode status includes:
attenuating the audio signal characteristics of the auditory theme representing the at least one participant when the at least one participant status is a background mode status.

23. A method comprising:
determining at least one auditory theme representing at least one participant in a networked group interaction;
modifying one or more audio signal characteristics of the auditory theme representing the at least one participant according to at least one characteristic of the at least one participant;
presenting the auditory theme representing the at least one participant; and
mixing the auditory theme with a second auditory signal representing an unable to accept communications status.

24. The method of claim 23 wherein the second auditory signal includes:
a busy signal.

* * * * *